United States Patent
Bao et al.

(10) Patent No.: US 12,266,211 B2
(45) Date of Patent: Apr. 1, 2025

(54) FORGERY DETECTION OF FACE IMAGE (71) Applicant: Microsoft Technology Licensing, LLC, Redmond, WA (US)

(72) Inventors: Jianmin Bao, Redmond, WA (US); Dong Chen, La Jolla, CA (US); Hao Yang, Redmond, WA (US); Ting Zhang, Redmond, WA (US); Fang Wen, Beijing (CN); Baining Guo, Redmond, WA (US); Lingzhi Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 17/777,572

(22) PCT Filed: Nov. 11, 2020

(86) PCT No.: PCT/US2020/059942
§ 371 (c)(1),
(2) Date: May 17, 2022

(87) PCT Pub. No.: WO2021/137946
PCT Pub. Date: Jul. 8, 2021

(65) Prior Publication Data
US 2023/0021661 A1 Jan. 26, 2023

(30) Foreign Application Priority Data
Dec. 30, 2019 (CN) .......................... 201911404028.0

(51) Int. Cl.
G06V 10/75 (2022.01)
G06V 10/26 (2022.01)
(Continued)

(52) U.S. Cl.
CPC .............. *G06V 40/16* (2022.01); *G06V 10/26* (2022.01); *G06V 10/754* (2022.01); *G06V 10/82* (2022.01);
(Continued)

(58) Field of Classification Search
CPC ...... G06V 40/16; G06V 10/26; G06V 10/754; G06V 10/82; G06V 40/161; G06V 40/168;
(Continued)

(56) References Cited

U.S. PATENT DOCUMENTS 8,582,833 B2 11/2013 Chung et al.
9,898,674 B2 2/2018 Connell et al.
(Continued)

OTHER PUBLICATIONS

Rossler et al., FaceForensics: A Large-scale Video Dataset for Forgery Detection in Human Faces, Mar. 2018, arXiv 1803.09179 v1 (Year: 2018).*

(Continued)

*Primary Examiner* — Said M Elnoubi
(74) *Attorney, Agent, or Firm* — Schwegman Lundberg & Woessner, P.A.

(57) ABSTRACT

In implementations of the subject matter as described herein, there is provided a method for forgery detection of a face image. Subsequent to inputting a face image, it is detected whether a blending boundary due to the blend of different images exists in the face image, and then a corresponding grayscale image is generated based on a result of the detection, where the generated grayscale image can reveal whether the input face image is formed by blending different images. If a visible boundary corresponding to the blending boundary exists in the generated grayscale image, it indicates that the face image is a forged image; on the contrary, if the visible boundary does not exist in the generated (Continued)

grayscale image, it indicates that the face image is a real image.

14 Claims, 5 Drawing Sheets

(51) Int. Cl.
  *G06V 10/82* (2022.01)
  *G06V 40/16* (2022.01)
  *G06V 40/40* (2022.01)
(52) U.S. Cl.
  CPC .......... *G06V 40/161* (2022.01); *G06V 40/168* (2022.01); *G06V 40/40* (2022.01); *G06V 10/759* (2022.01); *G06V 40/172* (2022.01)
(58) Field of Classification Search
  CPC .... G06V 40/40; G06V 10/759; G06V 40/172; G06V 40/45
  See application file for complete search history.

(56) References Cited

U.S. PATENT DOCUMENTS

| | | | |
|---|---|---|---|
| 10,810,725 B1 * | 10/2020 | Dolhansky | G06V 10/764 |
| 11,074,434 B2 | 7/2021 | Gupta et al. | |
| 2006/0020830 A1 | 1/2006 | Roberts | |
| 2010/0158319 A1 | 6/2010 | Jung et al. | |
| 2018/0232605 A1 | 8/2018 | Chen | |
| 2018/0285668 A1 | 10/2018 | Li et al. | |
| 2019/0332757 A1 | 10/2019 | Chen | |

OTHER PUBLICATIONS

Bharati, Aparna, et al., "Detecting Facial Retouching Using Supervised Deep Learning", In Journal of IEEE Transactions on Information Forensics and Security, vol. 11, Issue 9, Sep. 2016, pp. 1903-1913.
Hsu, Chih-Chung, et al., "Learning to Detect Fake Face Images in the Wild", In Journal of Computing Research Repository, Sep. 2018, 4 Pages.
"International Search Report and Written Opinion Issued in PCT Application No. PCT/US2020/059942", Mailed Date: Feb. 25, 2021, 11 Pages.
Rössler, Andreas, et al., "FaceForensics: A Large-scale Video Dataset for Forgery Detection in Human Faces", In Repository of arXiv:1803.09179v1, Mar. 24, 2018, 21 Pages.
Rössler, Andreas, et al., "FaceForensics++: Learning to Detect Manipulated Facial Images", In Repository of arXiv:1901.08971v1, Jan. 25, 2019, 12 Pages.
Seibold, Clemens, et al., "Detection of Face Morphing Attacks by Deep Learning", In Proceedings of 16th International Workshop on Digital Watermarking, Aug. 23, 2017, 13 Pages.
Singh, Vishal, "Image forgery detection", Retrieved From: https://towardsdatascience.com/image-forgery-detection-2ee6f1a65442, Feb. 6, 2019, 10 Pages.
First Office Action Received for Chinese Application No. 201911404028.0, mailed on Jul. 23, 2024, 15 pages. (English Translation Provided).
Communication pursuant to Article 94(3) received in European Application No. 20819994.3, mailed on Dec. 11, 2024, 13 pages.
Jain, et al., "On Detecting GANs and Retouching based Synthetic Alterations", In Proceedings of 2018 IEEE 9th International conference on biometrics theory, Oct. 22, 2018, 7 Pages.

* cited by examiner

FORGERY DETECTION OF FACE IMAGE

CROSS-REFERENCE TO RELATED APPLICATION

This application is a U.S. National Stage Filing under 35 U.S.C. 371 of International Patent Application Serial No. PCT/US2020/059942, filed Nov. 11, 2020, and published as WO 2021/137946 A1 on Jul. 8, 2021, which claims priority to Chinese Application No. 201911404028.0, filed Dec. 30, 2019, which applications and publication are incorporated herein by reference in their entirety.

BACKGROUND

Artificial Intelligent (AI) refers to intelligence shown by machines manufactured by human beings. AI attempts to produce an intelligent machine and/or program that can respond in a human intelligence-like manner. Implementation of AI models typically requires a massive amount of training data and powerful computing capability. With the continuous development of information technology and neural network research, AI has gradually been applied to various fields and scenarios, including chatbots, image recognition, speech recognition, natural language processing, autonomous driving, intelligent medical care, and the like.

AI face manipulation is an emerging AI technology application, which is based on deep learning algorithms, and can replace a human face in an image or video with another human face by simple operations. The image or video after replacement may be so realistic that even a human cannot identify whether the image has been tampered with. The rapid progress in AI face manipulation has enabled attackers to tamper with facial areas of images and generate new face images, e.g., to change the identity or modifying the face attributes.

SUMMARY

In implementations of the subject matter as described herein, there is provided a method of forgery detection on a face image. After a face image is inputted, it is detected whether a blending boundary due to a blend of different images exists in the face image, and then a corresponding grayscale image is generated based on a result of the detection, where the generated grayscale image can reveal whether the input face image is formed by blending different images. If a visible boundary corresponding to the blending boundary exists in the generated grayscale image, it indicates that the face image is a forged image; otherwise, if the visible boundary does not exist in the generated grayscale image, it indicates that the face image is a real image. As such, the implementations of the subject matter as described herein can detect accurately a forged face image by detecting the blending boundary in the input face image. In addition, the detection model in accordance with the implementations of the subject matter as described herein can be trained in a self-supervised fashion by using real images, such that the method for forgery detection of a face image as described herein can be applied more universally.

The Summary is provided for introducing a selection of concepts in a simplified form that will be further described below in the Detailed Description. This Summary is not intended to identify key features or essential features of the present disclosure, nor is it intended to limit the scope of the subject matter as described herein.

BRIEF DESCRIPTION OF THE DRAWINGS

Through the following detailed description with reference to the accompanying drawings, the above and other objectives, features, and advantages of example implementations of the subject matter as described herein will become more apparent, in which the same reference symbols generally refer to the same elements.

DETAILED DESCRIPTION OF IMPLEMENTATIONS

Implementations of the subject matter as described herein will now be described in detail below with reference to the accompanying drawings. Although some implementations disclosed herein are illustrated in the drawings, it should be appreciated that the subject matter as described herein can be implemented in various manners and should not be construed as limited to the implementations described herein. Rather, these implementations are provided merely for a thorough and full understanding of the present disclosure. It should be understood that the drawings and implementations are provided only by way of example and are not intended for limiting the scope disclosed herein in any manner.

As used herein, the term "includes" and its variants are to be read as open-ended terms that mean "includes, but is not limited to." The term "based on" is to be read as "based at least in part on." The term "an implementation" is to be read as "at least one example implementation;" the term "another implementation" is to be read as "at least one further implementation;" and the term "some implementations" is to be read as "at least some implementations." Related definitions of other terms will be given in the following description.

Nowadays, AI face manipulation has gained wide popularity particularly in social networks, arousing considerable concern for its influences in social networks and society. The forged images via AI face manipulation may be abused for malicious purposes, causing serious trust crisis and security issues. For example, some people produce forged images by using AI face manipulation to practice deception and spoofing.

Currently, there are lot of AI face manipulation methods or algorithms, such as DeepFakes (DF), Face2Face (F2F), FaceSwap (FS), NeuralTextures (NT), and the like. These methods typically blend the altered faces into existing background images, and the face images obtained through such blending methods are referred to as forged face image. So far, the forged face images have been so lifelike that even humans can hardly discern them. Generally speaking, real/fake detection on AI face manipulation is a challenging task, since the real/fake detection is typically performed with little knowledge about the face forgery methods.

In order to discern a forged face image from a real face image, a binary classifier is typically trained by using real face images and forged face images generated through a certain blending method, to achieve a high accuracy of detection of forged images. The legacy methods typically include training in a supervised fashion and implement training and optimization on known face forgery methods. As a result, the legacy methods can achieve relatively high detection accuracy in face images that are forged by using the known face forging methods. However, this may just be a result of overfitting, and the detection is only confined to known forgery methods involved in the targeted training. However, the legacy methods often fail in the detection of forged face images generated by using unknown forgery methods, resulting in a significant decrease in detection accuracy. In view of this, the legacy forgery detection methods for face images are not general and the accuracy of those methods is unstable and low.

To this end, implementations of the present disclosure provide a forgery detection method of a face image, which innovatively proposes to detect a blending boundary in a forged image and can attain relatively high accuracy in general face forgery detection. The inventors of the present application have noticed that there is an essential image difference inside and outside a blending boundary in a case where an image is generated by blending two images. As such, in accordance with the implementations of the subject matter as described herein, after inputting a face image, it is detected whether a blending boundary due to a blend of different images exists in the face image, and then a corresponding grayscale image is generated based on the result of detection, where the grayscale image can reveal whether the input face image is formed by blending different images. In other words, a corresponding grayscale image can be computed for an input face image. The grayscale image can be used not only for determining whether the input face image is forged or real, but also for identifying a position of a blending boundary (if any) via a visible boundary.

In accordance with the implementations of the subject matter as described herein, if the generated grayscale image includes a visible boundary (e.g., a bright white ring), it indicates that the face image is a forged image; on the contrary, if the visible boundary does not exist in the generated grayscale image, it indicates that the face image is a real image. Accordingly, the implementations of the subject matter as described herein can detect more accurately a forged face image by detecting a blending boundary in an input face image. Since only assuming a blending step exists and independent of artifact knowledge associated with specific face forgery methods, the detection method in accordance with the implementations of the subject matter as described herein is general.

In addition, a detection model in accordance with some implementations of the subject matter as described herein may be trained by using real images in a self-supervised fashion. Since the face forgery detection method in accordance with implementations of the subject matter as described therein is not trained with the forged images generated from the legacy forgery methods, the method as described herein is more general and can achieve higher detection accuracy even for forged images generated from unknown forgery methods. As a matter of fact, some implementations of the subject matter as described herein may not even require the training with forged images generated from the legacy forgery methods, and thereby higher detection accuracy can be achieved for any forged image formed by image blending.

The method for forgery detection of a face image in accordance with implementations of the subject matter as described herein is applicable to various forgery detection scenarios. For example, it may be employed in a social network to automatically verify whether face images or videos submitted by users are real or not, or used for a search engine to filter out some forged images as the search results, or applied for credit and privacy management needs, or utilized by a third party as an Application Program Interface (API) of a cloud platform which, for example, may provide a universal interface for forgery detection of face images, universal interface for forgery detection of face videos, and the like.

Figure 1:
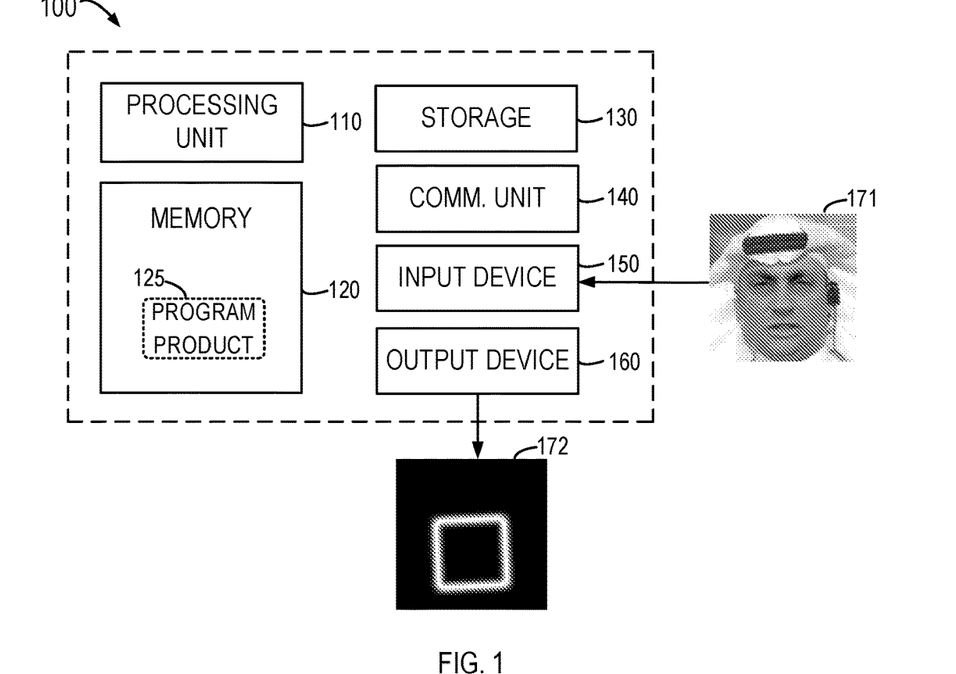
FIG. 1 illustrates a block diagram of a computing device/server in which one or more implementations of the subject matter as described herein can be implemented.

Basic principles and several example implementations of the subject matter as described herein will be described below with reference to FIGS. 1-8. FIG. 1 illustrates a block diagram of a computing device/server 100 in which one or more implementations of the subject matter as described herein can be implemented. It should be appreciated that the computing device/server 100 as shown in FIG. 1 is provided merely as an example, rather than constituting any limitation to the functionalities and scope of implementations as described herein.

As shown in FIG. 1, the computing device/server 100 is in the form of a general computing device. Components of the computing device/server 100 may include, but are not limited to, one or more processors or processing units 110, a memory 120, a storage 130, one or more communication units 140, one or more input devices 150, and one or more output devices 160. The processing unit 110 may be any physical or virtual processor and can perform various processing based on programs stored in the memory 120. In a multi-processor system, multiple processing units execute computer-executable instructions in parallel to improve the parallel processing capacity of the computing device/server 100.

The computing device/server 100 typically includes a plurality of computer storage media, which may be any available media accessible by the computing device/server 100, including, but not limited to, volatile and non-volatile media, and removable and non-removable media. The memory 120 may be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage 130 may be any removable or non-removable medium, and may include a machine-readable medium, such as a flash drive, disk or any other medium, which can be used for storing information and/or data (for example, training data for training) and accessed in the computing device/server 100.

The computing device/server 100 may further include additional removable/non-removable, volatile/non-volatile memory media. Although not shown in FIG. 1, a disk drive may be provided for reading or writing a removable and non-volatile disk and a disc drive may be provided for reading or writing a removable non-volatile disc. In these cases, each drive may be connected to the bus (not shown) via one or more data medium interfaces. The memory 120 may include a computer program product 125 having one or more program modules which are configured to perform the method or acts of various implementations of the present disclosure.

The communication unit 140 communicates with a further computing device via communication media. In addition, functionalities of components in the computing device/server 100 may be implemented by a single computing cluster or multiple computing machines connected communicatively for communication. Therefore, the computing device/server 100 may be operated in a networking environment using a logical link with one or more other servers, network personal computers (PCs) or another general network node.

The input device 150 may include one or more input devices, such as a mouse, keyboard, tracking ball, and the like. The output device 160 may include one or more output devices, such as a display, loudspeaker, printer and the like. As required, the computing device/server 100 may also communicate via the communication unit 140 with one or more external devices (not shown) such as a storage device, display device and the like, one or more devices that enable users to interact with the computing device/server 100, or any devices that enable the computing device/server 100 to communicate with one or more other computing devices (for example, a network card, modem, and the like). Such communication may be performed via an input/output (I/O) interface (not shown).

As shown in FIG. 1, the computing device/server 100 may receive an input image 171 including a face via the input device 150, then process the input image 171 by using a program product 125, and output, via the output device 160, a grayscale image 172 as a processing result. In the example as shown in FIG. 1, the input image 171 is a forged image formed by blending two images, and thus the grayscale image 172 as the output result contains a visible boundary in a white bright ring which indicates the blending position of the two images. Considering that the white boundary in the grayscale image 172 is similar to X-ray, the grayscale image in the implementations of the subject matter as described herein is also referred to as "face X-ray." Consequently, for an input image 171, the implementations of the subject matter as described herein can rapidly and accurately detect a blending boundary therein (if any), such that they cannot only indicate whether the input face image is a forged image but can also specify the position of the forged region in the forged image.

It should be appreciated by those skilled in the art that, although FIG. 1 shows receiving the input image 171 via the input unit 150 and outputting the grayscale image 172 via the output unit 160, the input image 171 may be received and/or the output image 172 may be transmitted via a communication unit 140, or the input image 171 may be obtained via an inner or external storage device, or the like. The manner of obtaining an input image is not limited to the implementations of the subject matter as described herein. Hereinafter, reference will be made to FIGS. 2-8 to describe in detail example implementations on how the program product 125 generates the output image 172 based on the input image 171.

Figure 2:
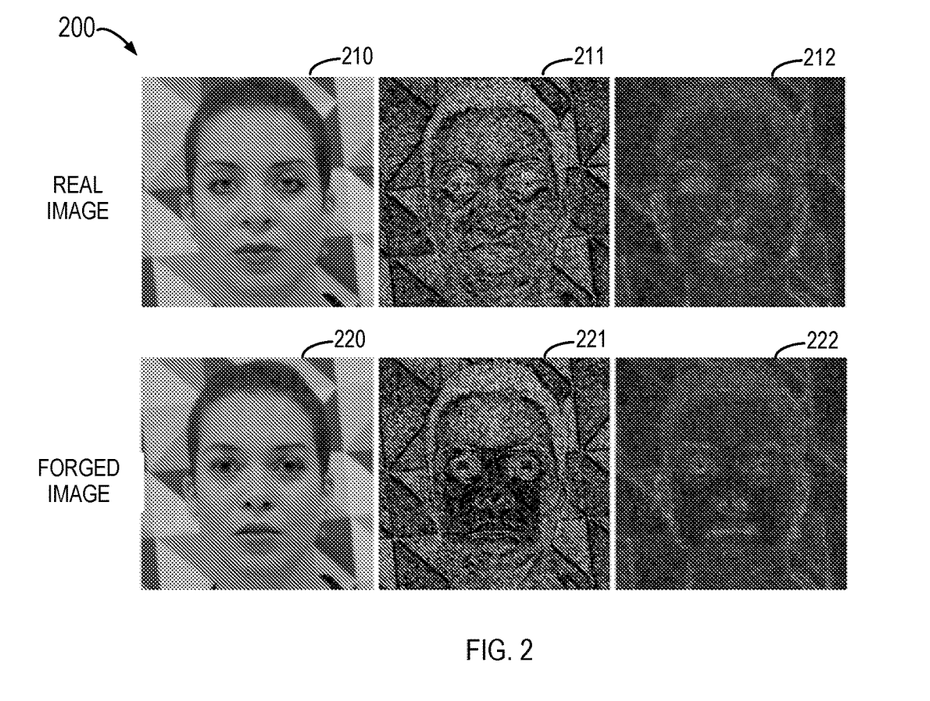
FIG. 2 illustrates a schematic diagram of noise analysis and error level analysis of real and fake images in accordance with implementations of the subject matter as described herein.

FIG. 2 illustrates a schematic diagram 200 of noise analysis and error level analysis of real and fake images in accordance with the implementations of the subject matter as described herein. In the implementations of the subject matter as described herein, there is provided an image representation, namely a grayscale image, for detecting a forged face image. The inventors of the present application have found that most of the legacy face forgery methods include a common step of blending an altered face into an existing background image, and there are inherent image differences in the blending boundary. These discrepancies make the blending boundary fundamentally detectable. Indeed, due to different manners of obtaining, each image has its own distinctive marks introduced either from hardware (e.g., a sensor and lens) or software components (e.g., compression, synthesis algorithm), and those marks tend to present similarity throughout the entire image. On the contrary, images obtained in different manners show different similarities.

For example, each image has its unique marks or underlying statistics, which mainly come from two aspects: 1) hardware, e.g., Color Filter Array (CFA) interpolation introducing periodic patterns, camera response function that should be similar for each of the color channels, sensor noise including a series of on-chip processing (such as, quantization, white balancing, and the like), which introduces a distinct signature; and 2) software, e.g., lossy compression schemes that introduce consistent blocking artifacts, and Generative Adversarial Network (GAN)-based synthesis algorithms that may leave unique imprints. All the foregoing hardware and software factors may contribute to image formation and leave specific signatures that tend to be periodic or homogeneous, which may be disturbed in an altered image. As a result, inconsistencies of the underlying image statistics across the blending boundary can be used to discover the blending boundary and thereby detecting the forged face image.

Noise analysis and Error Level Analysis (ELA) are two representative types of distinctive marks. Regarding the noise analysis, a natural image is typically full of noisy pixels. If the image is altered, a visible trace is usually left in the noise of the image. As a result, a very simple noise reduction filter (e.g., a separable median filter) may be used and then its result is reversed, so as to realize noise analysis. The principle of the ELA lies in analyzing a compression ratio of respective areas of the image and computing its error level to determine whether the image has ever been subjected to post-processing, such as splicing, modification, smudging, and the like. Basically, for an original image obtained through only one sampling, ELA values in respective areas should be similar; and if the ELA value of an area is remarkably distinguished from other parts of the image, the area probably has been later altered or substituted. The general principle of ELA is to split an image into many pixel points in 8×8 squares and perform individual color space transfer on each small block. For each modification on the image, a second transfer is performed. Considering that discrepancies are definitely caused by two transfers, which part of the image is altered can be determined in ELA by comparing the discrepancies.

As shown in FIG. 2, for a real image 210, its noise analysis result 211 and error level analysis result 212 present similarities throughout the entire image. In contrast, for a forged image 220, its noise analysis result 221 and error level analysis result 222 are not homogeneous throughout the entire image, where the altered image region has a higher brightness than other regions. For example, the color of the middle regions of the images 221 and 222 is different than that of the outer regions, indicating that the middle region of the image 220 is replaced by another image. With these findings, the inventors of the present application propose to detect whether an image is forged by using a blending boundary where two images are blended.

Figure 3:
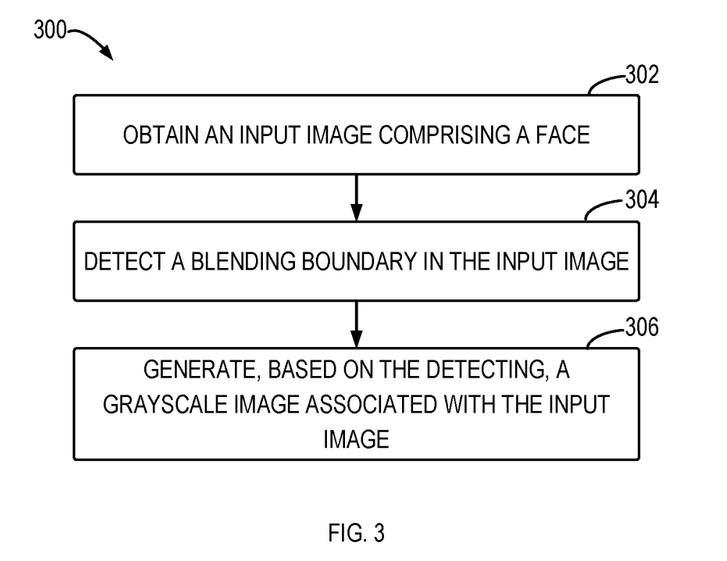
FIG. 3 illustrates a flowchart of a method for forgery detection of a face image in accordance with implementations of the subject matter as described herein.

FIG. 3 illustrates a flowchart of a method 300 for forgery detection of a face image in accordance with implementations of the subject matter as described herein. It should be appreciated that the method 300 may be executed by the computing device/server 100 as described with reference to FIG. 1. It should be noted that the method 300 in accordance with the implementations of the subject matter as described herein may be executed fully locally at user equipment (e.g., a smart phone, tablet computer, desktop computer, notebook computer, smart wearable device, and the like), or executed fully at a server side (e.g., a single server, distributed server, cloud, and the like), or partly deployed locally at the user equipment and partly deployed at the server side or in cloud, which is not limited in the implementations of the subject matter as described herein.

At 302, an input image including a face is obtained. For example, a detection model obtains the input image 171 to be detected that includes a human face. For example, if the detection model in accordance with the implementations of the subject matter as described herein may be a Fully Convolutional Neural Network (FCNN) model, the input image may be input into the FCNN model. In the implementations of the subject matter as described herein, the input image 171 may be a forged image formed by face replacement, and FIG. 5 will further describe an example process of forming a forged image. It should be appreciated that, since a blending boundary between two images is detected according to the implementations of the subject matter as described herein, a forged image generated through image blending can be detected. For an image forged or generated as a whole, since there is no blending boundary, such an image cannot be determined as a forged image.

At 304, a blending boundary in the input image is detected. For example, the FCNN model may detect whether the blending boundary due to a blending of different images exists in the input image 171. In general, in a face forgery scenario, a face or at least a part of the face (e.g., nose, mouth, and/or the like) is located within the blending boundary. In some implementations, if the blending boundary is detected, it indicates that a face region within the blending boundary in the input image is forged; and if no blending boundary is detected, it indicates that the input image is a real image.

At 306, a grayscale image associated with the input image is generated based on the detection, where the grayscale image indicates whether the face in the input image is forged. For example, the grayscale image 172 may be generated based on a detection result of the blending boundary, and by observing or analyzing the grayscale image 172, it can be determined whether the face in the input image is forged. In some implementations, it can be determined whether a visible boundary corresponding to a position of the blending boundary exists in the grayscale images. In other words, the position of the visible boundary in the grayscale image corresponds to the position of the blending boundary in the input image. For example, the visible boundary may be embodied as a bright white ring in the grayscale image, which indicates inconsistencies inside and outside the boundary and/or unevenness over the boundary. If there is a blending boundary, it indicates that the face region within the blending boundary in the input image is forged; otherwise, it indicates that the input image is a real image. Consequently, the method 300 in accordance with the implementations of the subject matter as described herein can detect more accurately a forged face image by detecting the blending boundary in the input face image.

The grayscale image (i.e., "face X-ray") provided in accordance with the implementations of the subject matter as described herein can be developed to be a general face forgery detection model, in the sense that it only assumes the existence of a blending step and does not rely on any knowledge of the artifacts associated with a particular face forgery algorithm. Such generalization capability is applicable to most of the existing face forgery algorithms.

In some implementations, a detection model may be trained in a self-supervised learning fashion, in which massive blended images synthesized from real images are used, rather than forged images generated by using any existing face forgery methods. Therefore, the method in accordance with the implementations of the subject matter as described herein is still feasible even when applied to a forged image generated by using unseen face forgery methods; and in contrast, most of the legacy face forgery detection methods in such a case will experience a significant degradation in performance. Self-supervised learning is a machine learning method, in which a model directly learns from unlabeled data, without manually labeling the data. As a result, the self-supervised learning can utilize various labels acquired from data without incurring extra labeling cost, which saves the cost of training data, and thus a larger number of training data can be obtained, improving the detection accuracy of the model.

Figure 4:
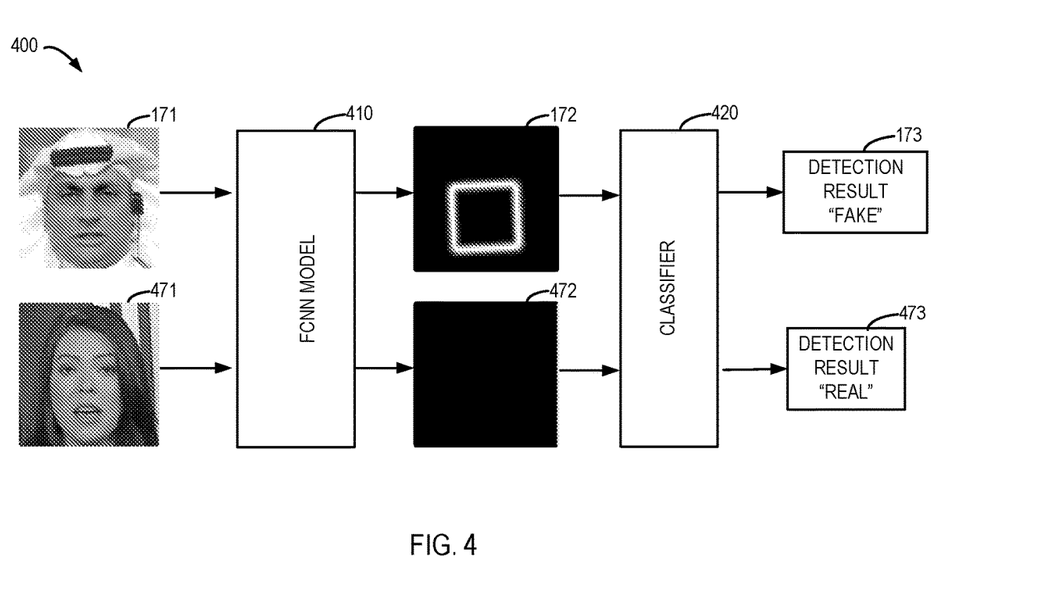
FIG. 4 illustrates a schematic diagram of a framework for forgery detection of a face image in accordance with implementations of the subject matter as described herein.

FIG. 4 illustrates a schematic diagram of a framework 400 for forgery detection of a face image in accordance with implementations of the subject matter as described herein. As shown in FIG. 4, the framework 400 mainly includes a Fully Convolutional Neural Network (FCNN) model 410 and a classifier 420. The FCNN model refers to a neural network fully comprised of convolution layers, and the difference from the classic CNN model lies in that: in FCNN, the fully connected layers in the classic CNN are all replaced by convolution layers. The examples of FCNN include HRNet, CovNet, and the like. Accordingly, the FCNN model can input an image and output an image as a processing result. In some implementations, the FCNN model 410 may include a backbone network and an upsampling network. For example, representations from all four different resolutions may be concatenated to the same size 64×64, followed by a 1×1 convolution layer with one output channel, a bilinear upsampling layer with 256×256 output size, and a Sigmoid function.

The classifier 420 may be a neural network model including an average pooling layer, a fully connected layer, and a softmax activation layer, and can determine, based on the grayscale image, a probability that the face in the input image is forged. The classifier 420 may be substantially a binary classifier that outputs classifications based on the input image, or may be a small-scale neural network model.

As shown in FIG. 4, the FCNN model 410 generates, based on the input image 171, a corresponding grayscale image 172. The classifier 420 generates, based on the grayscale 172 (including a white, visible boundary), a detection result 173 of the input image 171, which indicates that the input image 171 is a forged image in which the forged region is the face region within the white visible boundary in the grayscale image 172.

Likewise, the FCNN model 410 generates, based on the input image 471, a corresponding grayscale image 472. The classifier 420 generates, based on the grayscale image 472 (which is an all-black image), a detection result 473 for the input image 471, which indicates that the input image 471 is a real image in which no blending boundary exists, and thus there is no image blending process.

In some implementations, the framework 400 can implement forgery detection on a video, in addition to the forgery detection on the image. More specifically, a plurality of frames may be first extracted from the video, for example, according to a predetermined number of frames per minute. Then, each of the frames is analyzed; and if a frame includes a face, the frame is then input to the FCNN model 410 for face forgery detection.

Figure 5:
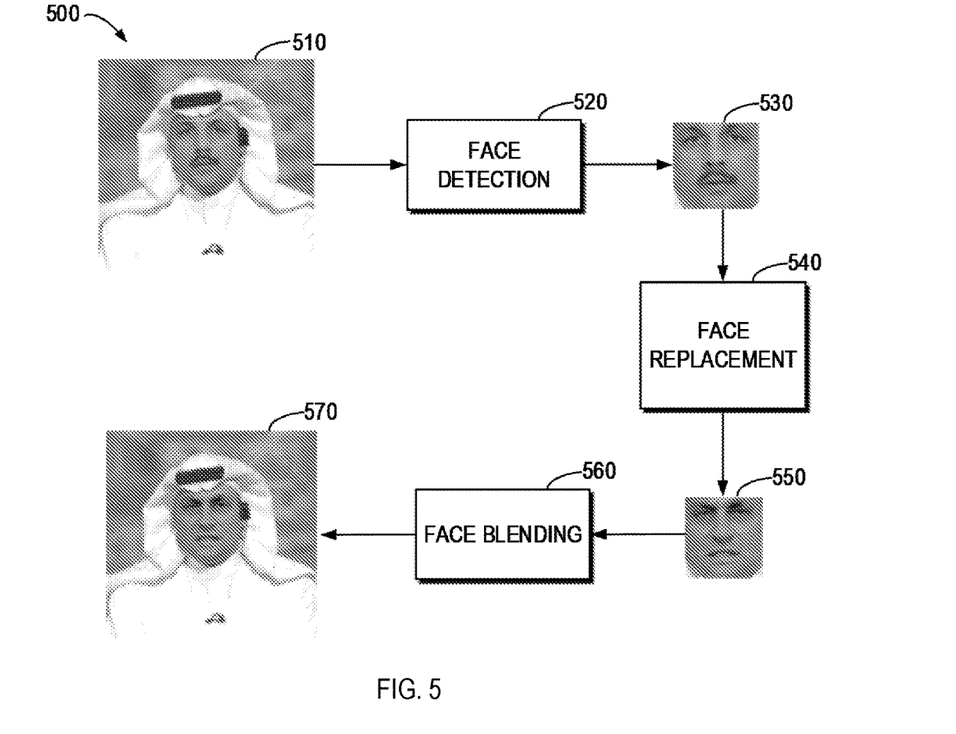
FIG. 5 illustrates a schematic diagram of an image blending process based on face detection.

FIG. 5 illustrates a schematic diagram of an image blending process 500 based on face detection, which may be an example method for generating a forged image, mainly including three stages. In a first stage 520, a face 530 region in an image 510 is detected, and then a similar face is searched. In a second stage 540, the face 530 is replaced by a similar face 550. Subsequently, in a third stage 560, the similar face 550 is blended into the original image 510 to form a forged image 570. As compared with the original image 510, the face in the forged image 570 is substituted.

In general, the legacy face forgery detection methods focus on the second stage in which a supervised binary classifier is trained based on a dataset including synthesized videos generated by using the forgery methods and real videos. Although the trained model can achieve high detection accuracy on the test datasets, the performance of the model degrades significantly when it is applied to unseen fake images. In contrast, the face forgery detection method in accordance with the implementations of the subject matter as described herein focuses on the third stage. Instead of obtaining the synthesized artifacts in the second stage, the implementations of the subject matter as described herein attempts to locate the blending boundary that is universally introduced in the third stage. The implementations of the subject matter as described herein are based on a key observation that: when an image is formed by blending two images, there exist intrinsic image discrepancies across the blending boundary.

Figure 6:
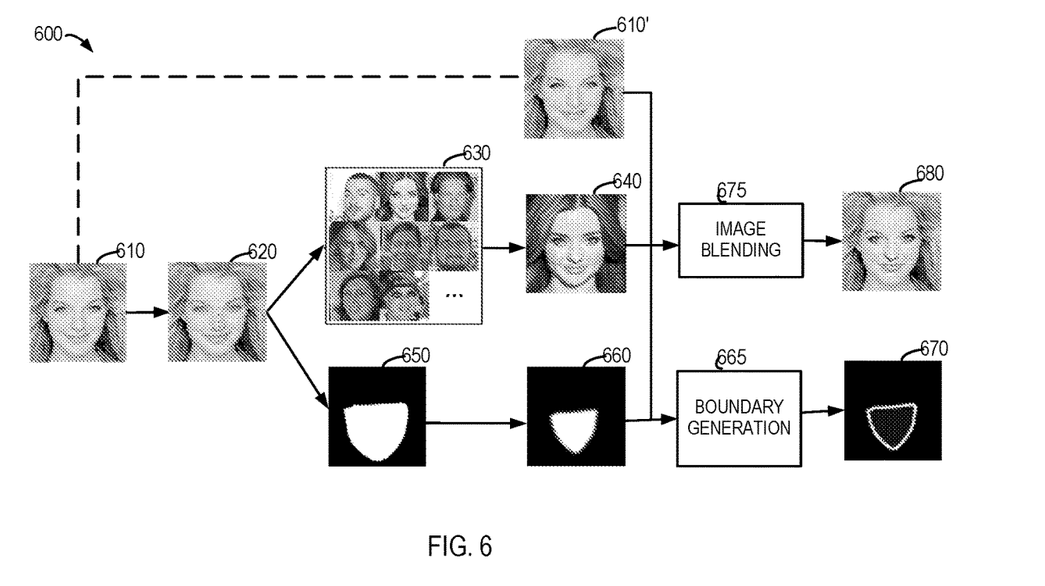
FIG. 6 illustrates a schematic diagram of a process for generating training data in accordance with implementations of the subject matter as described herein.

FIG. 6 illustrates a schematic diagram of a process 600 of generating training data in accordance with implementations of the subject matter as described herein. In accordance with the implementations of the subject matter as described herein, the process 600 of generating training data may mainly include three phases.

At a first phase of the process 600 of generating training data, a real image 610 (i.e., the image $I_B$) is obtained from a training dataset; a plurality of facial landmarks in the image 610 are extracted to obtain an image 620 with facial landmarks; and then, another image 640 (i.e., the image $I_F$) including a further face of optimum match is searched by using the extracted facial landmarks, to replace the face in the real image 610. In some implementations, a target image including a further face matched with the facial landmarks in the real image 610 may be searched. For example, based on a Euclidean distance between the facial landmarks, a similar face image may be searched from a random subset of training videos or images. In some implementations, in order to improve randomness of training data, it may search in a set of target images 630 including other faces that match the face in the real image (e.g., which may include 100 images including the same or similar face contours), and then an image is selected randomly from the set of target images 630 as the target image 640. In this way, randomness and diversity of training data can be further enhanced, thereby improving the generalization capability of the detection model.

At a second phase of the process 600 of generating training data, a mask is generated to define a forged region. In some implementations, a mask image 650 for replacement of at least a part of the face may be determined based on the plurality of facial landmarks in the image 620. For example, outermost points in the plurality of facial landmarks may be connected to form a mask, for example, in a convex-hull fashion. That is, an initial mask may be defined as a convex hull of the real image 610. Given that respective face forgery methods are not always concentrated on the same part of the face, forged regions in forged images may vary in shape. For example, the whole face may be forged, or only a part of the face (e.g., mouth or the like) may be forged. In order to cover as many mask shapes as possible, a random shape deformation may be adopted (for example, using the piecewise affine transform estimated from a source 16 points that are selected from a 4×4 grid to 16 target points that are deformed using random offset), and then Gaussian blur with a random kernel size may be applied to generate a final mask. In other words, the mask region in the mask image 650 may be deformed randomly, and Gaussian blur is applied on the edge of the mask region deformed randomly, then a final mask image 660 is generated. The random deformation and/or Gaussian blur can further randomize the mask region and further blur the edge of the mask, which is helpful for subsequent generation of the visible boundary.

At a third phase of the process 600 of generating training data, a blended image 680 is generated. At 675, the blended image 680 is generated through image blending and based on the real image 610' (i.e., the real image 610 or a copy thereof), the target image 640 and the mask image 660. In some implementations, prior to the image blending, color correction may be performed on the target image 640 so as to match the color of the real image 610. In addition, at 665, a mask boundary (i.e., the bright white ring in the grayscale image 670) is obtained based on the mask image 660, and a corresponding grayscale image 670 is generated accordingly.

In some implementations, given an input face image I, it is expected to determine whether the image is an image $I_M$ obtained by combining two images $I_F$ and $I_B$, as the following Equation (1):

$$I_M = M \odot I_F + (1-M) \odot I_B \tag{1}$$

where $\odot$ represents element-wise multiplication, $I_F$ is a foreground forged face image with desired facial attributes, and $I_B$ is an image that provides a background. M is a mask delimiting a forged region, where each pixel of M has a grayscale value between 0 and 1. When all values are defined between 0 and 1, it is a binary mask. Moreover, before blending, some color correction technologies may be applied to the foreground image $I_F$, to match its color with the background image color.

In some implementations of the subject matter as described herein, the grayscale image may be defined as image B, such that if the input image is a forged image, B will reveal the blending boundary, and if the input image is a real image, values of all the pixels of B are zero. For an input face image I, its grayscale image B may be defined as the following Equation (2):

$$B_{i,j} = 4 \cdot M_{i,j} \cdot (1 - M_{i,j}) \tag{2}$$

where the subscripts (i,j) represent indices of a pixel location, and M is the mask that is determined from the input image I. If the input image is real, then the mask M is a trivial blank image, and pixel values of which are all 0 or all 1. Otherwise, the mask M will be a nontrivial image delimiting the foreground image region. The maximum value of $M_{i,j} \cdot (1-M_{i,j})$ is no greater than 0.25, and in fact only when $M_{i,j}=0.5$, will the maximum value 0.25 be reached. For this reason, the pixel $B_{i,j}$ in the grayscale image is always valued between 0 and 1.

Figure 7:
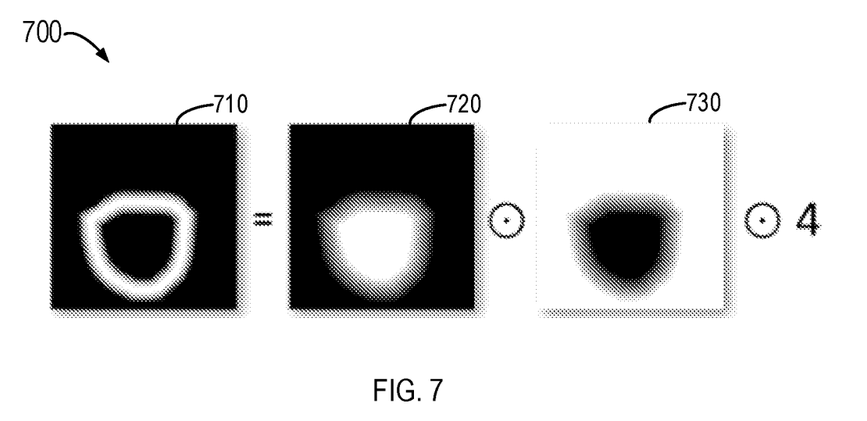
FIG. 7 illustrates a schematic diagram of determining a grayscale image based on a mask image in accordance with implementations of the subject matter as described herein.

Reference is now made to FIG. 7, which illustrates a schematic diagram 700 for determining the grayscale image B based on the mask image M in accordance with implementations of the subject matter as described herein. As shown in FIG. 7, a grayscale image 710 is obtained by performing the element-wise multiplication on a mask image 720 and a reversed mask image 730 which is obtained by performing NOT operation on the mask image 720. In this way, the grayscale image can be determined based on the mask image, and a visible boundary in the determined grayscale image has a certain width.

Returning to FIG. 6, if the mask image 660 is a binary mask, then before proceeding to 665, a 3×3 Gaussian kernel is used to transfer the binary mask into a soft mask. In the implementations of the subject matter as described herein, it is typically assumed that the mask image 660 is not a binary mask. A binary mask may hinder the generation of a grayscale image in the implementations of the subject matter as described herein and brings about a failure in generation of a visible boundary to be detected.

Therefore, the objective of the implementations of the subject matter as described herein is to find a nontrivial soft mask, and thereby obtain the blending boundary and a blended image 680 formed by blending two images. As discussed above, due to the differences in the image acquisition processes, images from different sources have intrinsic discrepancies despite their subtlety and invisibility to human eyes. To this end, the grayscale image in accordance with the implementations of the subject matter as described herein is a computational representation for discovering such differences in an input face image from an unknown origin.

According to the process 600 of generating training data in FIG. 6, training data may be generated dynamically online following the training process, and then the FCNN model 410 is trained in a self-supervised fashion. For example, the blended image 680 and the corresponding grayscale image 670 are paired to train the FCNN model 410. Since the process of generating a blended image in the process 600 does not involve certain one or more face image forgery methods and is additionally provided with a lot of random factors, the training data generated are more random such that the FCNN model 410 can achieve high detection accuracy on forged images generated by using various methods.

Through the process 600, a large number of training data can be generated only using real images 610. Let the generated training dataset be D={I, B, c}, where I represents the image, B represents a corresponding grayscale image, and c is a binary scalar specifying whether the image I is real or blended. The FCNN-based framework 400 in accordance with the subject matter as described herein can generate the grayscale image B based on an input image I, and then output, based on the grayscale image B, a probability of the input image I being real.

The framework 400 as shown in FIG. 4 may be trained in a joint training fashion. Let $\hat{B}=NN_b(I)$ be a predicted grayscale image, where $NN_b$ is the FCNN model 410 as shown in FIG. 4, and $\hat{c}=NN_c(\hat{B})$ is a predicted real/forged probability, where $NN_c$ is the classifier 420 in FIG. 4. At the training phase, a loss function, either existing or to be developed in the future, may be used for the two predictions. For example, for the FCNN model 410, a cross entropy loss function $L_b$ may be used to estimate the predicted accuracy, as the following Equation (3):

$$L_b = -\sum_{\{I,B\}\in\mathcal{D}} \frac{1}{N} \sum_{i,j} \left(B_{i,j}\log\hat{B}_{i,j} + (1-B_{i,j})\log(1-\hat{B}_{i,j})\right) \tag{3}$$

where N is the total number of pixels in a feature map, and i and j represent indices of pixel locations.

For the classifier 420, the loss function $L_c$ may be expressed as the following Equation (4):

$$L_c = -\sum_{\{I,c\}\in\mathcal{D}} (c\log(\hat{c}) + (1-c)\log(1-\hat{c})) \tag{4}$$

Accordingly, an overall loss function of the framework 400 may be defined as $L=\lambda L_b + L_c$, where $\lambda$ is a loss weight balancing $L_b$ and $L_c$. In some implementations, $\lambda$ may be set to a greater value (e.g., 100) to force the network to focus more on learning grayscale image prediction. In some implementations, the framework 400 in the implementations of the subject matter as described herein may be trained in an end-to-end manner of back propagation.

Figure 8:
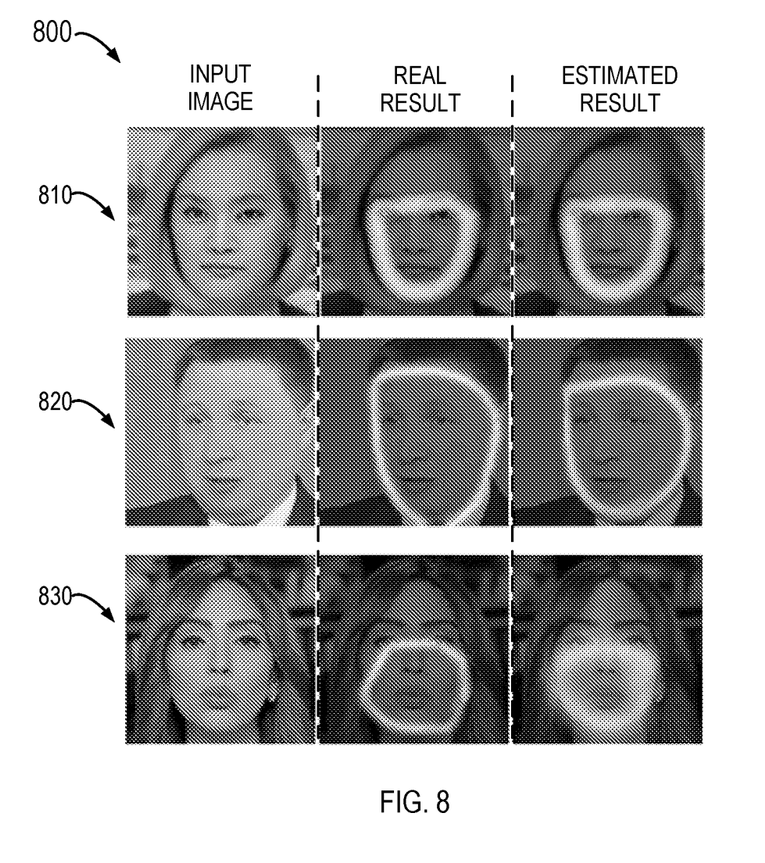
FIG. 8 is renderings for detecting forged regions in face images in accordance with implementations of the subject matter as described herein.

FIG. 8 is renderings for detecting a forged region in a face image in accordance with implementations of the subject matter as described herein. As shown in FIG. 8, a first column represents forged input images; a second column represents real results of the blending boundaries, which may be obtained by computing the absolute element-wise difference between the forged image and the corresponding real image; and a third column represents predicted results of the blending boundaries in accordance with the implementations of the subject matter as described herein, which presents an indication on a forged region (for example, which is shown with a white boundary) in a corresponding original input image. From the real results in the second column, the part below the eyelashes in the input image 810 is forged; the entire face in the input image 820 is forged; and a part (i.e., nose and mouth) of the face in the input image 830 is forged. By comparison of the second column with the third column, it can be concluded that, whether to replace a whole face or a part of the face, the method in accordance with the implementations of the subject matter as described herein can determine, via a blending boundary, whether the face image is forged and the specific region that is forged, thereby implementing more accurate and general detection of forged face images.

Furthermore, through experiments, the inventors have found that the forgery detection method of a face image in accordance with implementations of the subject matter as described herein can significantly improve the generalization capability. The implementations of the subject matter as described herein can achieve relatively high detection accuracy on unknown face forgery methods, and can achieve extremely high detection accuracy on known face forgery methods.

Therefore, the implementations of the subject matter as described herein can implement forgery detection in a more general manner, namely through a grayscale image (i.e., "face X-ray"). The generalization ability in accordance with some implementations of the subject matter as described herein mainly comes from two factors: first, detecting a blending boundary in an image, rather than focusing on a particular forged image; and second, automatically constructing a large number of training samples from real images such that the model is adapted to focus more on the blending boundary of the image. Finally, the method provided in accordance with the implementations of the subject matter as described herein can achieve relatively high detection accuracy even if only self-supervised training data is used.

In addition, the training data in accordance with the implementations of the subject matter as described herein are generated more randomly from real images, rather than generated by one or more existing face image forgery algorithms. In the meantime, the region inside the boundary of the blended image of the training data generated in accordance with the implementations of the subject matter as described herein is real image, rather than a synthesized one, which allows the model avoid overfitting and thus introducing a better generalization performance.

The method and functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include, but is not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the subject matter as described herein will be given below.

In one aspect, there is provided a computer-implemented method. The method comprises: obtaining an input image comprising a face; detecting a blending boundary in the input image; and generating, based on the detecting, a grayscale image associated with the input image, wherein the grayscale image indicates whether the face in the input image is forged.

In some implementations, the method further comprises: determining whether a visible boundary exists in the grayscale image, the visible boundary corresponding to the blending boundary; in accordance with a determination that the visible boundary exists in the grayscale image, determining that a face region within the blending boundary in the input image is forged; and in accordance with a determination that the visible boundary does not exist in the grayscale image, determining that the input image is a real image.

In some implementations, generating the grayscale image associated with the input image comprises: generating the grayscale image by a Fully Convolutional Neural Network (FCNN) model, and the method further comprises: determining, by a classifier and based on the grayscale image, a probability that the face in the input image is forged, wherein the classifier is a neural network model comprising a pooling layer, a fully connected layer and an activation layer.

In some implementations, the method comprises: generating, based on a real image in a training dataset, a blended image and a corresponding grayscale image; and training the FCNN model by using the blended image and the corresponding grayscale image.

In some implementations, generating the corresponding grayscale image comprises: detecting a plurality of facial landmarks in the real image; determining, based on the plurality of facial landmarks, a mask image for replacement of at least a part of a face; and generating, based on the mask image, the corresponding grayscale image.

In some implementations, determining the mask image comprises: performing random shape deformation on a mask region in the mask image; and performing Gaussian blur on edges of the mask region subjected to the random shape deformation.

In some implementations, generating the blended image comprises: searching, based on the facial landmarks, a target image comprising a further face matching the face in the real image; and generating the blended image, based on the real image, the target image and the mask image.

In some implementations, searching the target image comprising the further face matching the face in the real image comprises: searching in a set of target images comprising other faces matching the face in the real image; and selecting randomly an image from the set of the target images as the target image.

In some implementations, the method further comprises determining, based on the visible boundary in the grayscale image, a forged region in the input image, the forged region comprising at least part of the face; and presenting on the input image an indication on the forged region.

In some implementations, obtaining the input image comprising the face comprises: extracting an image frame from a video; and in accordance with a determination that the image frame comprises the face, determining that the image frame is the input image.

In a further aspect, there is provided an electronic device. The electronic device comprises: a processing unit; and a memory coupled to the processing unit and having instructions stored thereon, the instructions, when executed by the processing unit, performing acts of: obtaining an input image comprising a face; detecting a blending boundary in the input image; and generating, based on the detecting, a grayscale image associated with the input image, where the grayscale image indicates whether the face in the input image is forged.

In some implementations, the acts further comprise: determining whether a visible boundary exists in the grayscale image, the visible boundary corresponding to the blending boundary; in accordance with a determination that the visible boundary exists in the grayscale image, determining that a face region within the blending boundary in the input image is forged; and in accordance with a determination that the visible boundary does not exist in the grayscale image, determining that the input image is a real image.

In some implementations, generating the grayscale image associated with the input image comprises: generating the grayscale image by a Fully Convolutional Neural Network (FCNN) model, and the method further comprises: determining, by a classifier and based on the grayscale image, a probability that the face in the input image is forged, wherein the classifier is a neural network model comprising a pooling layer, a fully connected layer and an activation layer.

In some implementations, the acts comprise: generating, based on a real image in a training dataset, a blended image and a respective grayscale image; and training the FCNN model by using the blended image and the corresponding grayscale image.

In some implementations, generating the corresponding grayscale image comprises: detecting a plurality of facial landmarks in the real image; determining, based on the plurality of facial landmarks, a mask image for replacement of at least a part of a face; and generating, based on the mask image, the corresponding grayscale image.

In some implementations, determining the mask image comprises: performing random shape deformation on a mask region in the mask image; and performing Gaussian blur on edges of the mask region subjected to the random shape deformation.

In some implementations, generating the blended image comprises: searching, based on the facial landmarks, a target image comprising a further face matching the face in the real image; and generating the blended image based on the real image, the target image and the mask image.

In some implementations, searching the target image comprising the further face matching the face in the real image comprises: searching in a set of target images comprising other faces matching the face in the real image; and selecting randomly an image from the set of the target images as the target image.

In some implementations, the acts further comprise determining, based on the visible boundary in the grayscale image, a forged region in the input image, the forged region comprising at least part of the face; and presenting an indication of the forged region on the input image.

In some implementations, obtaining the input image comprising the face comprises: extracting an image frame from a video; and in accordance with a determination that the image frame comprises a face, determining the image frame to be the input image.

In a further aspect, there is provided a computer program product. The computer program product is stored in a non-transitory computer storage medium and has machine-executable instructions stored thereon. The machine-executable instructions, when running in a device, cause the device to: obtain an input image comprising a face; detecting a blending boundary in the input image; and generate, based on the detecting, a grayscale image associated with the input image, wherein the grayscale image indicates whether the face in the input image is forged.

In some implementations, the instructions, when running in the device, cause the device to: determine whether a visible boundary exists in the grayscale image, the visible boundary corresponding to the blending boundary; in accordance with a determination that the visible boundary exists in the grayscale image, determine that a face region within the blending boundary in the input image is forged; and in accordance with a determination that the visible boundary does not exist in the grayscale image, determine that the input image is a real image.

In some implementations, generating the grayscale image associated with the input image comprises: generating the grayscale image by a Fully Convolutional Neural Network (FCNN) model, and the method further comprises: determining, by a classifier and based on the grayscale image, a probability that the face in the input image is forged, wherein the classifier is a neural network model comprising a pooling layer, a fully connected layer and an activation layer.

In some implementations, the instructions, when running in the device, cause the device to: generate, based on a real image in a training dataset, a blended image and a corresponding grayscale image; and train the FCNN model using the blended image and the corresponding grayscale image.

In some implementations, generating the corresponding grayscale image comprises: detecting a plurality of facial landmarks in the real image; determining, based on the plurality of facial landmarks, a mask image for replacement of at least a part of a face; and generating, based on the mask image, the corresponding grayscale image.

In some implementations, determining the mask image comprises: performing random shape deformation on a mask region in the mask image; and performing Gaussian blur on edges of the mask region subjected to the random shape deformation.

In some implementations, generating the blended image comprises: searching, based on the facial landmarks, a target image comprising a further face matching the face in the real image; and generating the blended image based on the real image, the target image and the mask image.

In some implementations, searching the target image comprising the further face matching the face in the real image comprises: searching in a set of target images comprising other faces matching the face in the real image; and selecting randomly an image from the set of the target images as the target image.

In some implementations, the instructions, when running in the device, cause the device further to: determine, based on the visible boundary in the grayscale image, a forged region in the input image, the forged region comprising at least a part of the face; and presenting an indication of the forged region on the input image.

In some implementations, obtaining the input image comprising the face comprises: extracting an image frame from a video; and in accordance with a determination that the image frame comprises a face, determining the image frame to be the input image.

Although the present disclosure has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
obtaining an input image comprising a face;
detecting a blending boundary in the input image; and
generating, based on the detecting, a grayscale image associated with the input image, the grayscale image indicating whether the face in the input image is forged, wherein generating the corresponding grayscale image comprises:
   detecting a plurality of facial landmarks in the real image;
   determining, based on the plurality of facial landmarks, a mask image for replacement of at least a part of a face by performing random shape deformation on a mask region in the mask image; and
   generating, based on the mask image, the corresponding grayscale image.

2. The method of claim 1, further comprising:
determining whether a visible boundary exists in the grayscale image, the visible boundary corresponding to the blending boundary;
in accordance with a determination that the visible boundary exists in the grayscale image, determining that a face region within the blending boundary in the input image is forged; and
in accordance with a determination that the visible boundary does not exist in the grayscale image, determining that the input image is a real image.

3. The method of claim 2, further comprising:
determining, based on the visible boundary in the grayscale image, a forged region in the input image, the forged region comprising at least a part of the face; and
presenting an indication of the forged region on the input image.

4. The method of claim 1, wherein generating the grayscale image associated with the input image comprises:
generating the grayscale image by a Fully Convolutional Neural Network (FCNN) model, the method further comprising:
   determining, by a classifier and based on the grayscale image, a probability that the face in the input image is forged, the classifier being a neural network model comprising a pooling layer, a fully connected layer and an activation layer.

5. The method of claim 4, further comprising:
generating, based on a real image in a training dataset, a blended image and a corresponding grayscale image; and
training the FCNN model by using the blended image and the corresponding grayscale image.

6. The method of claim 1, wherein determining the mask image further comprises:
performing Gaussian blur on edges of the mask region subjected to the random shape deformation.

7. The method of claim 1, wherein obtaining the input image comprising the face comprises:
extracting an image frame from a video; and
in accordance with a determination that the image frame comprises a face, determining the image frame to be the input image.

8. A computer-implemented method, comprising:
obtaining an input image comprising a face;
detecting a blending boundary in the input image; and
generating, based on the detecting, a boundary image and a grayscale image associated with the input image, the grayscale image indicating whether the face in the input image is forged,
wherein generating the corresponding grayscale image comprises:
   detecting a plurality of facial landmarks in the real image;
   determining, based on the plurality of facial landmarks, a mask image for replacement of at least a part of a face; and
   generating, based on the mask image, the corresponding grayscale image; and
wherein generating the blended image comprises:
   searching, based on the facial landmarks, a target image comprising a further face matching the face in the real image; and
   generating the blended image based on the real image, the target image and the mask image.

9. The method of claim 8, wherein searching the target image comprising the further face matching the face in the real image comprises:
searching in a set of target images comprising other faces matching the face in the real image; and
selecting randomly an image from the set of target images as the target image.

10. An electronic device, comprising:
a processing unit; and
a memory coupled to the processing unit and having instructions stored thereon, the instructions, when executed by the processing unit, performing acts of:
obtaining an input image comprising a face;
detecting a blending boundary in the input image; and
generating, based on the detecting, a grayscale image associated with the input image, the grayscale image indicating whether the face in the input image is forged by determining whether a bright ring exists in the grayscale image, the bright ring being a visible boundary in the grayscale image that corresponds to the blending boundary.

11. The device of claim 10, wherein
in accordance with a determination that the visible boundary exists in the grayscale image, determining that a face region within the blending boundary in the input image is forged; and
in accordance with a determination that the visible boundary does not exist in the grayscale image, determining that the input image is a real image.

12. The device of claim 10, wherein generating the grayscale image associated with the input image comprises: generating the grayscale image by a Fully Convolutional Neural Network (FCNN), and the acts further comprise:

determining, by a classifier and based on the grayscale image, a probability that the face in the input image is forged, the classifier being a neural network model comprising a pooling layer, a fully connected layer and an activation layer.

13. The device of claim 12, wherein the acts further comprise:

generating, based on a real image in a training dataset, a blended image and a corresponding grayscale image; and     training the FCNN model by using the blended image and the corresponding grayscale image.

14. A computer program product stored in a computer storage medium and including machine-executable instructions which, when running in a device, cause the device to:

obtain an input image comprising a face;

detect a blending boundary in the input image; and generate, based on the detecting, a grayscale image associated with the input image, the grayscale image indicating whether the face in the input image is forged by determining whether a bright ring exists in the grayscale image, the bright ring being a visible boundary in the grayscale image that corresponds to the blending boundary.

* * * * *